United States Patent
Sun et al.

(10) Patent No.: US 12,437,195 B2
(45) Date of Patent: Oct. 7, 2025

(54) SYSTEMS AND METHODS FOR PIPELINED HETEROGENEOUS DATAFLOW FOR ARTIFICIAL INTELLIGENCE ACCELERATORS

(71) Applicant: Taiwan Semiconductor Manufacturing Company, Ltd., Hsinchu (TW)

(72) Inventors: Xiaoyu Sun, Hsinchu (TW); Kerem Akarvardar, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 727 days.

(21) Appl. No.: 17/859,721

(22) Filed: Jul. 7, 2022

(65) Prior Publication Data

US 2024/0013042 A1     Jan. 11, 2024

(51) Int. Cl.
*G06N 3/08*     (2023.01)
*G06F 7/544*    (2006.01)

(52) U.S. Cl.
CPC ............. *G06N 3/08* (2013.01); *G06F 7/5443* (2013.01)

(58) Field of Classification Search
None
See application file for complete search history.

(56) References Cited

U.S. PATENT DOCUMENTS

2019/0114534 A1    4/2019  Teng et al.
2022/0012593 A1    1/2022  Huang et al.

FOREIGN PATENT DOCUMENTS

| CN | 109635944 A | 4/2019 |
| CN | 110263925 A | 9/2019 |
| CN | 111275167 A | 6/2020 |
| CN | 113298237 A | 8/2021 |

OTHER PUBLICATIONS

Lin et al., A 3.4-to-13.3TOPS/W 3.6TOPS Dual-Core Deep-Learning Accelerator for Versatile AI Applications in 7nm 5G Smartphone SoC, 2020 IEEE International Solid-State Circuits Conference; Total Pages: 3 (Year: 2020).*
Hanif et al., MPNA: A Massively-Parallel Neural Array Accelerator with Dataflow Optimization for Convolutional Neural Networks, arXiv:1810.12910v1 [cs.DC] Oct. 30, 2018; Total Pages: 8 (Year: 2018).*
Kwon et al., "Heterogeneous Dataflow Accelerators for Multi-DNN Workloads" The 27th IEEE International Symposium on High-Performance Computer Architecture (HPCA 2021), pp. 1-13.
Office Action issued in connection with Taiwan Appl. No. 112105438 dated Dec. 9, 2024.

* cited by examiner

*Primary Examiner* — Alan Chen
(74) *Attorney, Agent, or Firm* — FOLEY & LARDNER LLP

(57) ABSTRACT

Systems and methods for a pipelined heterogeneous dataflow for an artificial intelligence accelerator are disclosed. A pipelined processing core includes a first processing core configured to have a first type of dataflow and a second processing core configured to have a second type of dataflow. The first processing core includes a matrix array of PEs arranged in columns and rows, each of the PEs configured to perform a MAC operation based on an input and a weight. The second processing core is configured to receive an output from the first processing core. The second processing core includes a column of PEs configured to perform MAC operations.

17 Claims, 9 Drawing Sheets

| | Accelerator Type | CONV | FC | Total |
|---|---|---|---|---|
| Cycles | FDA | 4,884,438 | 10,768,640 | 15,653,078 |
| | HDA | 5,419,142 | 3,697,600 | 9,116,742 |
| Utilization | FDA | 86% | 2% | 28% |
| | HDA | 83% | 93% | 81% |
| Buffer Accesses | FDA | ~568M | ~498M | ~1.07B |
| | HDA | ~630M | ~469M | ~1.10B |

SYSTEMS AND METHODS FOR PIPELINED HETEROGENEOUS DATAFLOW FOR ARTIFICIAL INTELLIGENCE ACCELERATORS

BACKGROUND

Artificial intelligence (AI) is a powerful tool that can be used to simulate human intelligence in machines that are programmed to think and act like humans. AI can be used in a variety of applications and industries. AI accelerators are hardware devices that are used for efficient processing of AI workloads like neural networks. One type of AI accelerator includes a systolic array that can perform operations on inputs via multiplication and accumulate operations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 illustrates an example table that compares the cycles, utilization, and buffer accesses performed by the fixed dataflow accelerator and the heterogeneous dataflow accelerator, in accordance with some embodiments.

DETAILED DESCRIPTION

Figure 1:
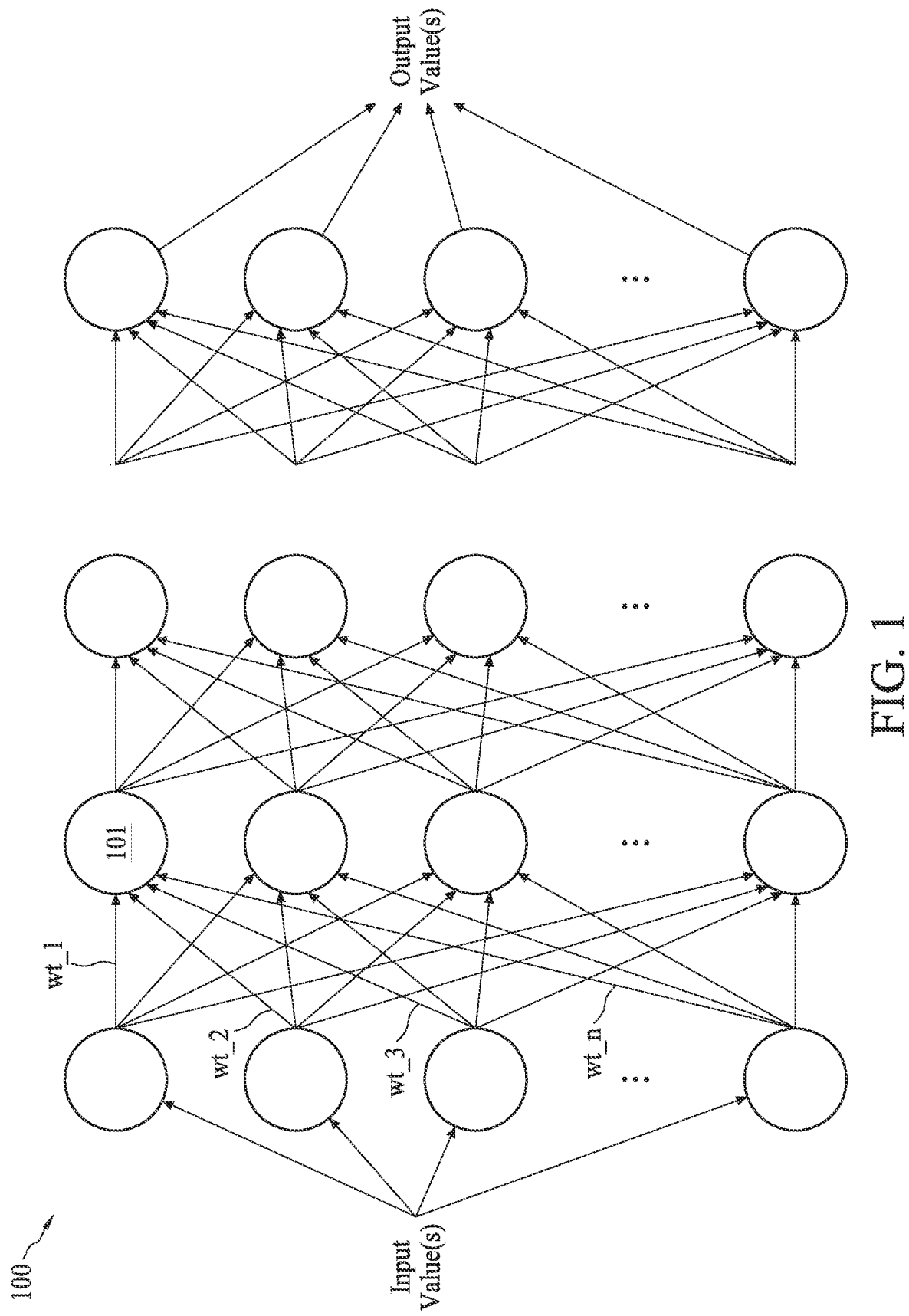
FIG. 1 illustrates an exemplary neural network, in accordance with various embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An AI accelerator is a class of specialized hardware to accelerate machine learning workloads for deep neural network (DNN) processing, which are typically neural networks that involve massive memory accesses and highly-parallel but simple computations. AI accelerators can be based on application-specific integrated circuits (ASIC) which include multiple processing elements (PEs) (or processing circuits) arranged spatially or temporally to perform the multiply-and-accumulate (MAC) operation. The MAC operation is performed based on input activation states (inputs) and weights, and then summed together to provide output activation states (outputs).

Typical AI accelerators (called fixed dataflow accelerator (FDAs)) are customized to support one fixed dataflow such as output stationary, input stationary, and weight stationary workflows. However, AI workloads include a variety of layer types/shapes that may favor different dataflows, e.g., one dataflow that fits one workload, or one layer may not be the optimal solution for the others, thus limiting the performance. For example, various layer types may include convolutional (CONV), depth-wise convolutional, fully connected (FC), etc. In a typical dataflow architecture, one or more CONV layers may be followed by an FC layer that outputs (or flattens) the previous outputs into a single vector. However, the CONV layer type is typically more efficient for certain dataflows and the FC layer type is typically more efficient for different dataflows. Given the diversity of the workloads in terms of layer type, layer shape, and batch size, one dataflow that fits one workload or one layer may not be the optimal solution for the others thus limiting the performance.

The present embodiments include novel systems and methods of pipelining computations for AI accelerators using CONV and FC cores. The CONV and FC cores, which are connected together, are configured for different types of workflows. For example, the CONV core may be customized for a weight stationary dataflow, and the FC core may be customized for an input stationary dataflow. The FC core can include a single-column of PEs. By using the optimal dataflow for CONV and FC separately and pipelining the computations in two cores, the overall latency and throughput can advantageously be improved. There is a practical application in that, among other things, by using a single-column of PEs for FC core, which eliminates the horizontal weight forwarding, the interconnect overhead of the core can be reduced. The disclosed technology also provides technical advantages over conventional systems because calculations performed by deep neural networks may be more efficiently performed due to the pipelined architecture.

FIG. 1 illustrates an exemplary neural network 100, in accordance with various embodiments. As shown, the inner layers of a neural network can largely be viewed as layers of neurons that each receive weighted outputs from the neurons of other (e.g., preceding) layer(s) of neurons in a mesh-like interconnection structure between layers. The weight of the connection from the output of a particular preceding neuron to the input of another subsequent neuron is set according to the influence or effect that the preceding neuron is to have on the subsequent neuron (for simplicity, only one neuron 101 and the weights of input connections are labeled). Here, the output value of the preceding neuron is multiplied by the weight of its connection to the subsequent neuron to determine the particular stimulus that the preceding neuron presents to the subsequent neuron.

A neuron's total input stimulus corresponds to the combined stimulation of all of its weighted input connections. According to various implementations, if a neuron's total input stimulus exceeds some threshold, the neuron is triggered to perform some, e.g., linear or non-linear mathematical function on its input stimulus. The output of the mathematical function corresponds to the output of the neuron which is subsequently multiplied by the respective weights of the neuron's output connections to its following neurons.

Generally, the more connections between neurons, the more neurons per layer and/or the more layers of neurons, the greater the intelligence the network is capable of achieving. As such, neural networks for actual, real-world artificial intelligence applications are generally characterized by large numbers of neurons and large numbers of connections between neurons. Extremely large numbers of calculations (not only for neuron output functions but also weighted connections) are therefore involved in processing information through a neural network.

As mentioned above, although a neural network can be completely implemented in software as program code instructions that are executed on one or more traditional general purpose central processing unit (CPU) or graphics processing unit (GPU) processing cores, the read/write activity between the CPU/GPU core(s) and system memory that is needed to perform all the calculations is extremely intensive. The overhead and energy associated with repeatedly moving large amounts of read data from system memory, processing that data by the CPU/GPU cores and then writing resultants back to system memory, across the many millions or billions of computations needed to effect the neural network have not been entirely satisfactory in many aspects.

Figure 2:
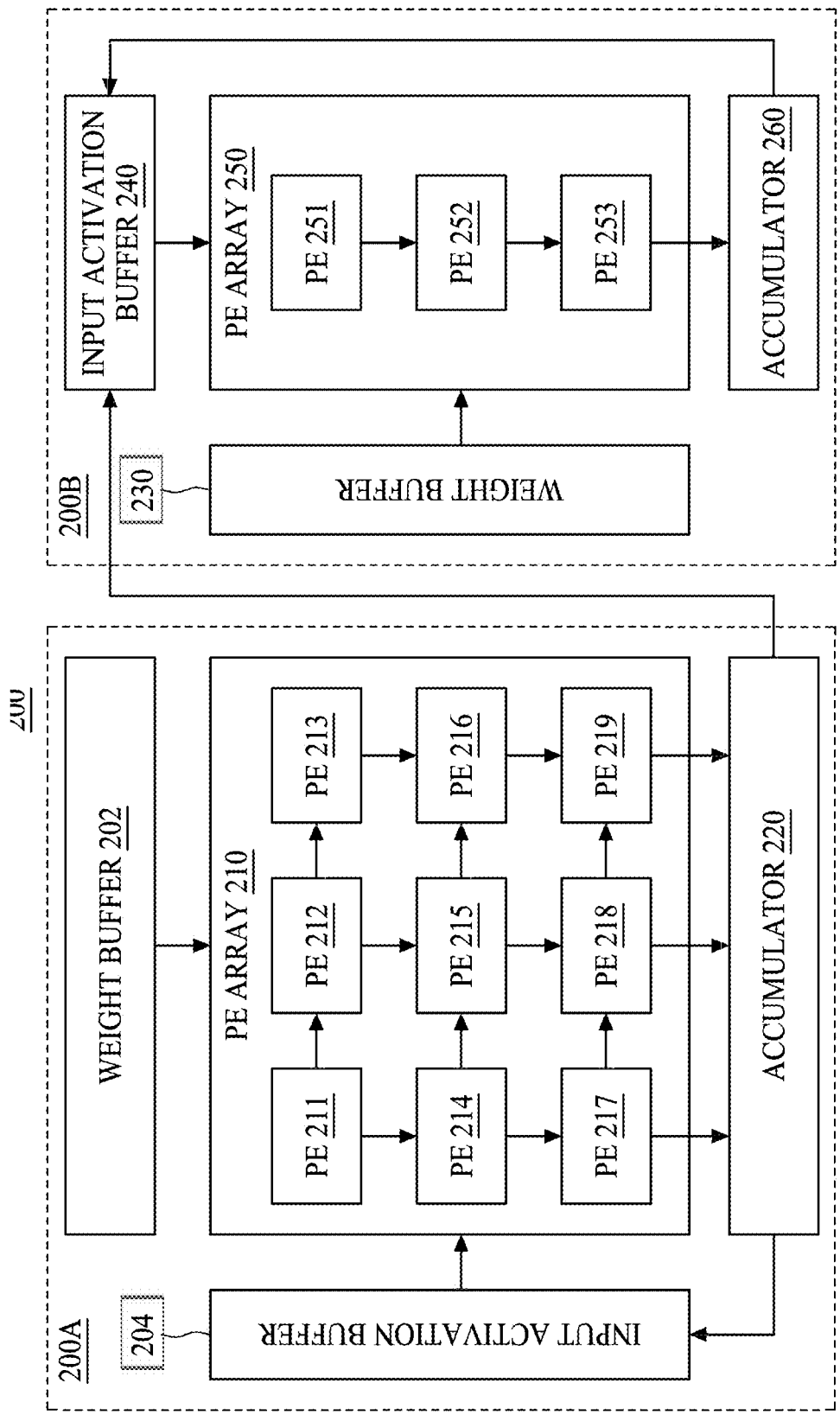
FIG. 2 illustrates an example block diagram of a pipelined core of an AI accelerator, in accordance with some embodiments.

FIG. 2 illustrates an example block diagram of a pipelined core 200 (or pipelined processing core) of an AI accelerator, in accordance with some embodiments. The pipelined core 200 includes a convolutional core 200A (or first processing core) and a fully connected core 200B (or second processing core). The convolutional core 200A includes a weight buffer 202, an input activation buffer 204, a PE array 210, and an accumulator 220. The fully connected core 200B includes a weight buffer 230, an input activation buffer 240, a PE array 250 (or column), and an accumulator 260. Although FIG. 2 shows a systolic array-based architecture, embodiments are not limited thereto, and other architectures may be used. For example, in a vector engine design, the one operand is held stationary at each PE, and the other one is fed to a row/column of PEs through multi-casting. Accordingly, the disclosed pipeline architecture can be applied to a WS/IS dataflow as disclosed herein. Although certain components are shown in FIG. 2, embodiments are not limited thereto, and more or fewer components may be included in the processor core 200. Although embodiments of the present disclosure are described with respect to a systolic-array based architecture, embodiments are not limited thereto and other architectures may be used. For example, architectures may include data flow, transport triggered, multicore, many-core, heterogeneous, in-memory computing, neuromorphic, and other types of architecture.

The pipelined core 200 represents a building block of a systolic array-based AI accelerator that models a neural network. In systolic array-based systems, data is processed in waves through pipelined core 200 which perform computations. These computations sometimes may rely on the computation of dot-products and absolute difference of vectors, typically computed with MAC operations performed on the parameters, input data and weights. MAC operations generally include the multiplication of two values, and the accumulation of a sequence of multiplications. One or more pipelined cores 200 can be connected together to form the neural network that may form a systolic array-based system that forms an AI accelerator. In some embodiments, an AI accelerator including the pipelined core 200 may also be called a heterogeneous dataflow accelerator (HDA).

The convolutional core 200A may be configured as a convolutional layer in the neural network 100. Convolution is a linear operation that involves the multiplication of a set of weights with the input using a filter. The filter is smaller than the input data and the type of multiplication applied between a filter-sized patch of the input and the filter is a dot product. A dot product is the element-wise multiplication between the filter-sized patch of the input and filter, which is then summed, resulting in a single value. Repeated application of the same filter to an input results in a map of activations called a feature map, indicating the locations and strength of a detected feature in an input, such as an image.

The weight buffer 202 includes one or more memories (e.g., registers) that can receive and store weights for a neural network. The weight buffer 202 may receive and store weights from, e.g., a different pipelined core 200 (not shown), a global buffer (not shown), or a different device. The weights from the weight buffer 202 may be provided to the PE array 210 for processing as described below.

The input activation buffer 204 includes one or more memories (e.g., registers) that can receive and store inputs (e.g., input activation data) for the neural network. For example, these inputs can be received as outputs from, e.g., a different pipelined core 200 (not shown), a global buffer (not shown), or a different device. The inputs from the input activation buffer 204 may be provided to the PE array 210 for processing as described below.

The PE array 210 includes PEs 211, 212, 213, 214, 215, 216, 217, 218, and 219 arranged in rows and columns. The first row includes PEs 211-213, the second row includes PEs 214-216, and the third row includes PEs 217-219. The first column includes PEs 211, 214, 217, the second column includes PEs 212, 215, 218, and the third row includes PEs 213, 216, 219. Although the pipelined core 200 includes nine PEs 211-219, embodiments are not limited thereto and the pipelined core 200 may include more or fewer PEs. The PEs 211-219 may perform MAC operations based on inputs and weights that are received and/or stored in the input activation buffer 204, weight buffer 202, or received from a different PE (e.g., PE 211-219). The output of a PE (e.g., PE 211) may be provided to one or more different PEs (e.g., PE 212, 214) in the same PE array 210 for multiplication and/or summation operations.

For example, the PE 211 may receive a first input from the input activation buffer 204 and a first weight from the weight buffer 202 and perform multiplication and/or summation operations based on the first input and first weight. The PE 212 may receive the output of the PE 211 and a second weight from weight buffer 202 and perform multiplication and/or summation operations based on the output of the PE 211 and the second weight. The PE 213 may receive the output of the PE 212 and a third weight from weight buffer 202 and perform multiplication and/or summation operations based on the output of the PE 212 and the third weight. The PE 214 may receive the output of the PE 211, a second input from the input activation buffer 204 and a fourth weight from weight buffer 202 and perform multiplication and/or summation operations based on the output of the PE 211, the second input, and the fourth weight. The PE 215 may receive the outputs of PEs 212 and 214 and a fifth weight from the weight buffer 202 and perform multiplication and/or summation operations based on the outputs of the PEs 212 and 214 and the fifth weight. The PE 216 may receive the outputs of PEs 213 and 215 and a sixth weight from the weight buffer 202 and perform multiplication and/or summation operations based on the outputs of the PEs 213 and 215 and the sixth weight. The PE 217 may receive the output of the PE 214, a third input from the input activation buffer 204 and a seventh weight from weight buffer 202 and perform multiplication and/or summation operations based on the output of the PE 214, the third input, and the seventh weight. The PE 218 may receive the outputs of PEs 215 and 217 and a eighth weight from the weight buffer 202 and perform multiplication and/or summation operations based on the outputs of the PEs 215 and 217 and the eighth weight. The PE 219 may receive the outputs of PEs 216 and 218 and a ninth weight from the weight buffer 202 and perform multiplication and/or summation operations based on the outputs of the PEs 216 and 218 and the ninth weight. For a bottom row of PEs of the PE array (e.g., PEs 217-219), the outputs may also be provided to the accumulator 220. Depending on embodiments, the first, second, and/or third inputs and/or the first to ninth weights and/or the outputs of the PEs 211-219 may be forwarded to some or all of the PEs 211-219. These operations may be performed in parallel such that the outputs from the PEs 211-219 are provided every cycle.

The accumulator 220 may sum the partial sum values of the results of the PE array 210. For example, the accumulator 220 may sum the three outputs provided by the PE 217 for a set of inputs provided by the input activation buffer 204. Each of the accumulator 220 may include one or more registers that store the outputs from the PEs 217-219 and a counter that keeps track of how many times the accumulation operation has been performed, before outputting the total sum to the output buffer 208. For example, the accumulator 220 may perform summation operation of the output of PE 217 three times (e.g., to account for the outputs from the three PEs 211, 214, 217) before the accumulator 220 provides the sum to the output buffer 208. Once the accumulator 220 finish summing all of the partial values, outputs may be provided to the input activation buffer 204 and/or input activation buffer 240 of the fully connected core 200B.

The fully connected core 200B may be configured as a convolutional layer in the neural network 100. In fully connected layers, the neuron applies a linear transformation to the input vector through a weights matrix. A non-linear transformation is then applied to the product through a non-linear activation function. All possible connections layer to layer are present, meaning every input of the input vector influences every output of the output vector. Typically, the last few layers in a machine learning model are fully connected layers and compile the data extracted data from the previous layers to form the final output (e.g., classification of the image).

In some embodiments, the fully connected core 200B may include a single column of PEs 251-253. Because the single column does not have wires (e.g., interconnect structures) that are disposed laterally from the PEs 251-253, any overhead in area and power due to the interconnect in a two dimensional array is reduced. Accordingly, the fully connected core 200B can perform the fully connected layer operation (e.g., for the input stationary dataflow) while reducing area and power.

The weight buffer 230 includes one or more memories (e.g., registers) that can receive and store weights for a neural network. The weight buffer 230 may receive and store weights from, e.g., a different pipelined core 200 (not shown), a global buffer (not shown), or a different device. The weights from the weight buffer 230 may be provided to the PE array 250 for processing as described below.

The input activation buffer 240 includes one or more memories (e.g., registers) that can receive and store inputs (e.g., input activation data) for the neural network. For example, these inputs can be received as outputs from, e.g., the accumulator 220 of the convolutional core 200A or the accumulator 260, a global buffer (not shown), or a different device. The inputs from the input activation buffer 240 may be provided to the PE array 250 for processing as described below.

The PE array 250 includes PEs 251, 252, and 253 arranged in a column. Although the fully connected core 200B includes three PEs 251-253, embodiments are not limited thereto and the fully connected core 200B may include more or fewer PEs. The PEs 251-253 may perform MAC operations based on inputs and weights that are received and/or stored in the input activation buffer 240, weight buffer 230, or received from a different PE (e.g., PE 251-253). The output of a PE (e.g., PE 251) may be provided to one or more different PEs (e.g., PE 252, 253) in the same PE array 250 for multiplication and/or summation operations.

For example, the PE 251 may receive a first input from the input activation buffer 240 and a first weight from the weight buffer 230 and perform multiplication and/or summation operations based on the first input and first weight. The PE 252 may receive the output of the PE 251, a second input from the input activation buffer 240 and a second weight from weight buffer 230 and perform multiplication and/or summation operations based on the output of the PE 251, the second input, and the second weight. The PE 253 may receive the output of the PE 252, a third input from the input activation buffer 240 and a third weight from weight buffer 230 and perform multiplication and/or summation operations based on the output of the PE 252, the third input, and the third weight. The output of the PE 253 may be provided to the accumulator 260. These operations may be performed in parallel such that the outputs from the PEs 251-253 are provided every cycle.

The accumulator 260 may sum the partial sum values of the results of the PE array 250. For example, the accumulator 260 may sum the three outputs provided by the PE 253 for a set of inputs provided by the input activation buffer 240. The accumulator 260 may include one or more registers that store the outputs from the PE 253 and a counter that keeps track of how many times the accumulation operation has been performed, before outputting the total sum to an output buffer (not shown) and/or the input activation buffer 240. For example, the accumulator 260 may perform summation operation of the output of PE 253 three times (e.g., to account for the outputs from the PEs 251-253) before the accumulator 260 provides the sum to the output buffer and/or the input activation buffer 240.

In some embodiments, a weight stationary dataflow achieves higher PE utilization than input stationary dataflow on convolutional layers (e.g., convolutional core 200A). And in some embodiments, an input stationary dataflow may achieve a higher PE utilization than weight stationary dataflows in fully connected layers (e.g., fully connected core 200B).

In some embodiments, because the convolutional core 200A and the fully connected core 200B can perform MAC operations for different dataflows (e.g., the convolutional core 200A performs MAC operations according to the weight stationary dataflow, and the fully connected core 200B performs MAC operations according to the input stationary dataflow), the AI accelerator implementing the pipelined core 200 may have a pipelined architecture. For example, in an image recognition application, a first image may be input through the input activation buffer 204 of the convolutional core 200A. The first image is processed by the convolutional core 200A via weight stationary dataflow, and the partial sums are calculated using the PE array 210. The partial sums are transferred down to the accumulator 220 where the partial sums are added together during the folding step of the computation. Then the full sums are provided from the accumulator 220 to the input activation buffer 240 of the fully connected core 200B. The fully connected core 200B, which is configured for the input stationary dataflow, can perform the computation of the first image. At the same time, a second image may be provided to the convolutional core 200A. For example, the second image may be provided to the input activation buffer 204. Then the second image may be analyzed by the convolutional core 200A while the first image is being analyzed by the fully connected core 200B.

Furthermore, it will be apparent to the person of ordinary skill in the art that the convolutional core 200A and/or the fully connected core 200B may be configured for different dataflows, depending on the type of workload. For example, the user may configure the convolutional core 200A to have an input stationary dataflow or output stationary dataflow, depending on the workload. Similarly, the user may configure the fully connected core 200B to have a weight stationary dataflow or an output stationary dataflow.

In some embodiments, when a user wants to set up a neural network with multiple convolutional layers followed by multiple fully connected layers, the accumulator 220 may provide the partial/full sums as an input to the input activation buffer 204 so that the convolutional core 200A can be repeatedly used for additional convolutions. Similarly, the accumulator 260 may provide the partial/full sum to the input activation buffer 240 for additional fully connected MAC operations.

Figure 3:
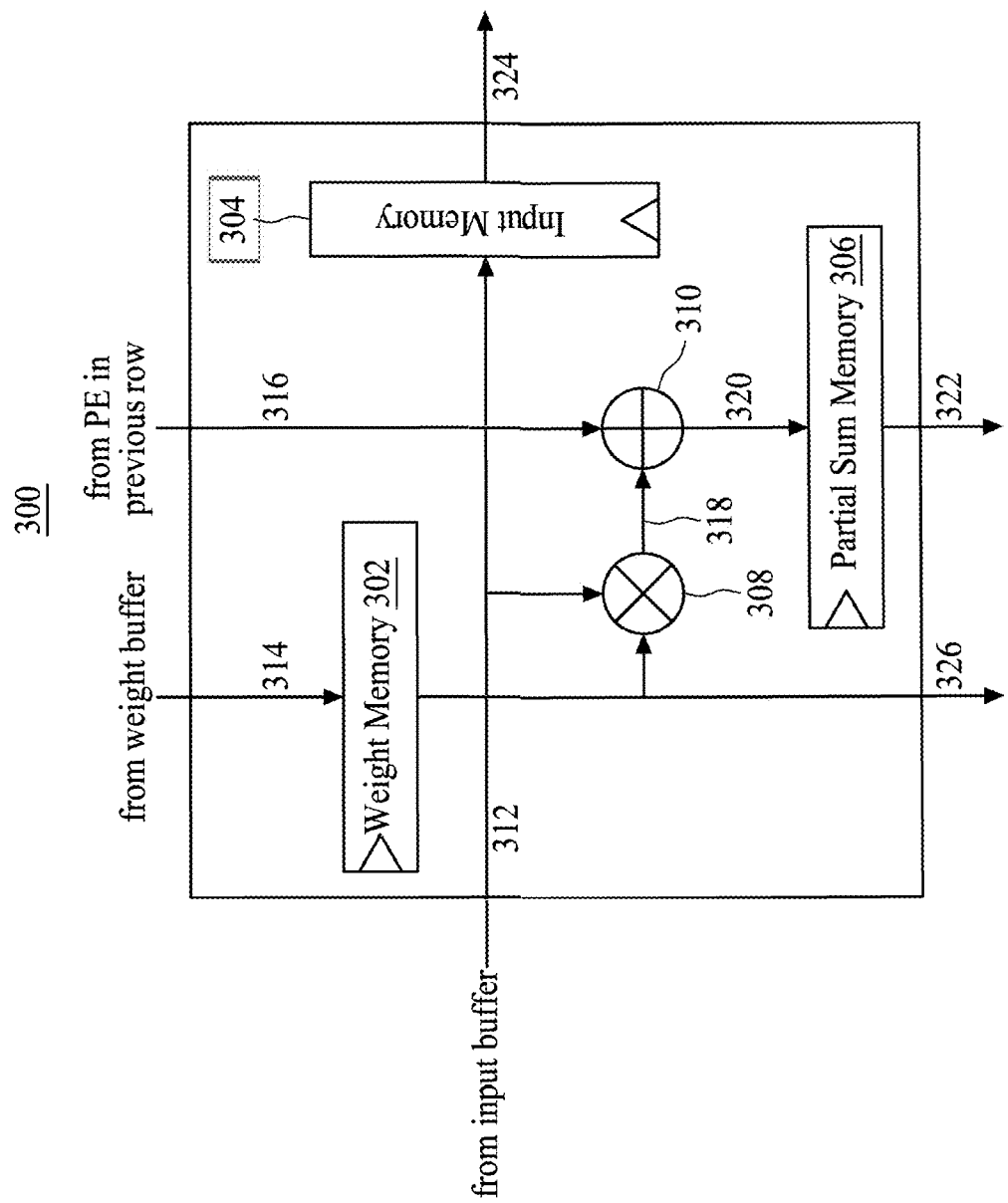
FIG. 3 illustrates an example block diagram of a PE that is configured for the weight stationary dataflow, in accordance with some embodiments.

FIG. 3 illustrates an example block diagram of a PE 300 that is configured for the weight stationary dataflow, in accordance with some embodiments. Each of the PEs 211-219 may include the PE 300 when the convolutional core 200A is configured as a weight stationary dataflow. The PE 300 includes memories (e.g., registers) including a weight memory 302, an input memory 304, and a partial sum memory 306. The PE also includes a multiplier 308 and an adder 310 for performing the MAC operation. Although the PE 300 includes certain components, embodiments are not limited thereto, and other components may be added, removed, or rearranged.

A weight 314 is received from a weight buffer (e.g., weight buffer 202) and buffered in the weight memory 302. The weight 314 is reloaded in the weight memory 302 every cycle during the operation (e.g., a new weight in the weight memory 302 is not written to). Input activation states 312 are provided from an input buffer (e.g., input activation buffer 204) and forwarded horizontally through the input memory 304 (e.g., the input memory 304 is written into every cycle) and output as input activation state 324 to another PE 300 that is in the next column. The weight 314 from the weight memory 302 and the input activation state 312 are multiplied using the multiplier 308. A partial sum 316 from a PE 300 of the previous row is provided as an input to the adder 310. The product 318 and the partial sum 316 are summed and output as output 320 to the partial sum memory 306. The partial sum 320 is provided as output 322 to a PE 300 of the next row. For the bottom row of PEs 300 (e.g., PEs 217-219), the outputs 322 are provided to an accumulator (e.g., accumulator 220) to accumulate the partial sums when folding occurs.

Figure 4:
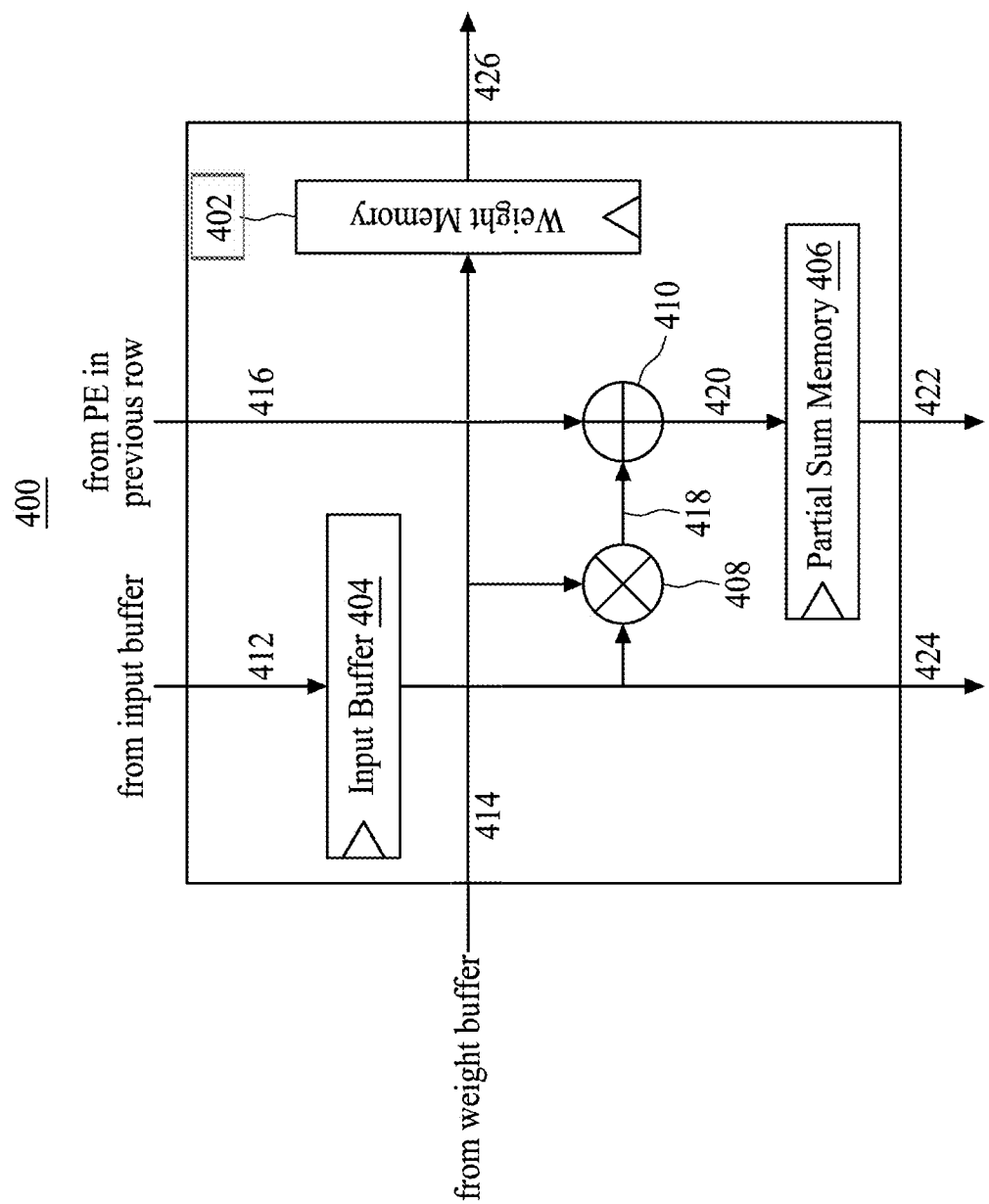
FIG. 4 illustrates an example block diagram of a PE that is configured for the input stationary dataflow, in accordance with some embodiments.

FIG. 4 illustrates an example block diagram of a PE 400 that is configured for the input stationary dataflow, in accordance with some embodiments. Each of the PEs 251-253 may include the PE 400 when the fully connected core 200B is configured as input stationary dataflow. The PE 400 includes memories (e.g., registers) including a weight memory 402, an input memory 404, and a partial sum memory 406. The PE also includes a multiplier 408 and an adder 410 for performing the MAC operation. Although the PE 400 includes certain components, embodiments are not limited thereto, and other components may be added, removed, or rearranged.

An input 412 is received from an input buffer (e.g., input activation buffer 240) and buffered in the input memory 404. The input 412 is reloaded in the input memory 404 every cycle during the operation (e.g., a new input in the input memory 404 is not written to). Weights 414 are provided from a weight buffer (e.g., weight buffer 230) and forwarded horizontally through the weight memory 402 (e.g., the weight memory 402 is written into every cycle) and output as input activation state 424 to another PE that is in the next row. The weight 414 and the input activation state 412 are multiplied using the multiplier 408. A partial sum 416 from a PE 400 of the previous row is provided as an input to the adder 410. The product 418 and the partial sum 416 are summed and output as output 420 to the partial sum memory 406. The partial sum 420 is provided as output 422 to a PE 400 of the next row. For the bottom row of PEs 400 (e.g., PE 253), the outputs 422 are provided to an accumulator (e.g., accumulator 260) to accumulate the partial sums for the columns when folding occurs.

Figure 5:
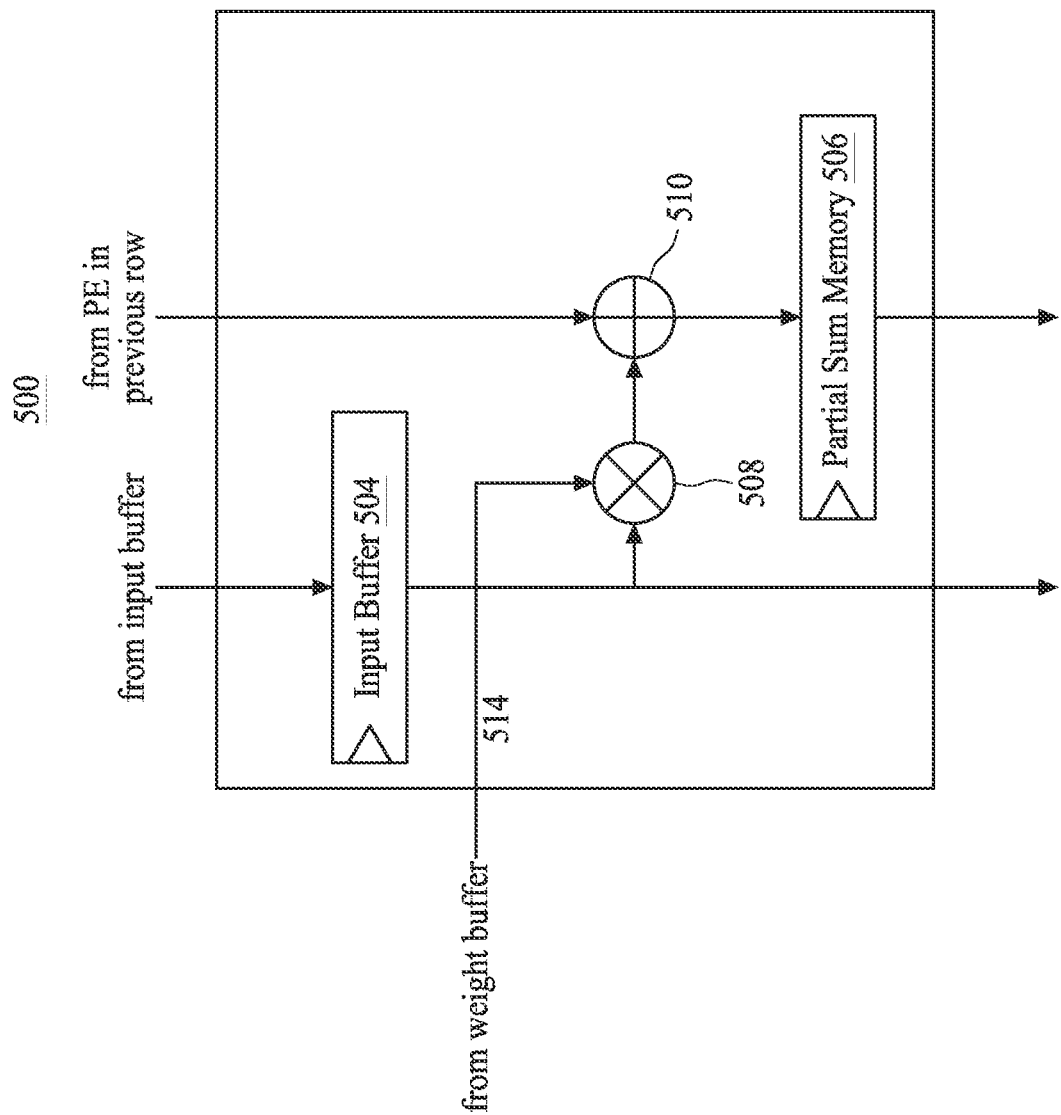
FIG. 5 illustrates another example block diagram of a PE that is configured for the input stationary dataflow, in accordance with some embodiments.

FIG. 5 illustrates another example block diagram of a PE 500 that is configured for the input stationary dataflow, in accordance with some embodiments. Each of the PEs 251-253 may include the PE 500 when the fully connected core 200B is configured as input stationary dataflow. The PE 500 includes memories (e.g., registers) including a weight memory 502, an input memory 504, and a partial sum memory 506. The PE also includes a multiplier 508 and an adder 510 for performing the MAC operation. Although the PE 500 includes certain components, embodiments are not limited thereto, and other components may be added, removed, or rearranged.

The operations of the PE 500 may be similar to the operations of the PE 400. For example, the PE 500 may be configured for an input stationary dataflow. However, PE 500 does not include a weight memory (e.g., like the weight memory 402 of FIG. 4) because the weights 514 from the weight buffer are not provided to a PE of another column. Instead, the weights from the weight buffer (e.g., weight buffer 230) may be provided directly to the multiplier 508 for the MAC operation. Accordingly, the PE 500 may have a reduced area and power consumption because the PE 500 does not include a memory in the PE 500 for the weights 514.

Figure 6:
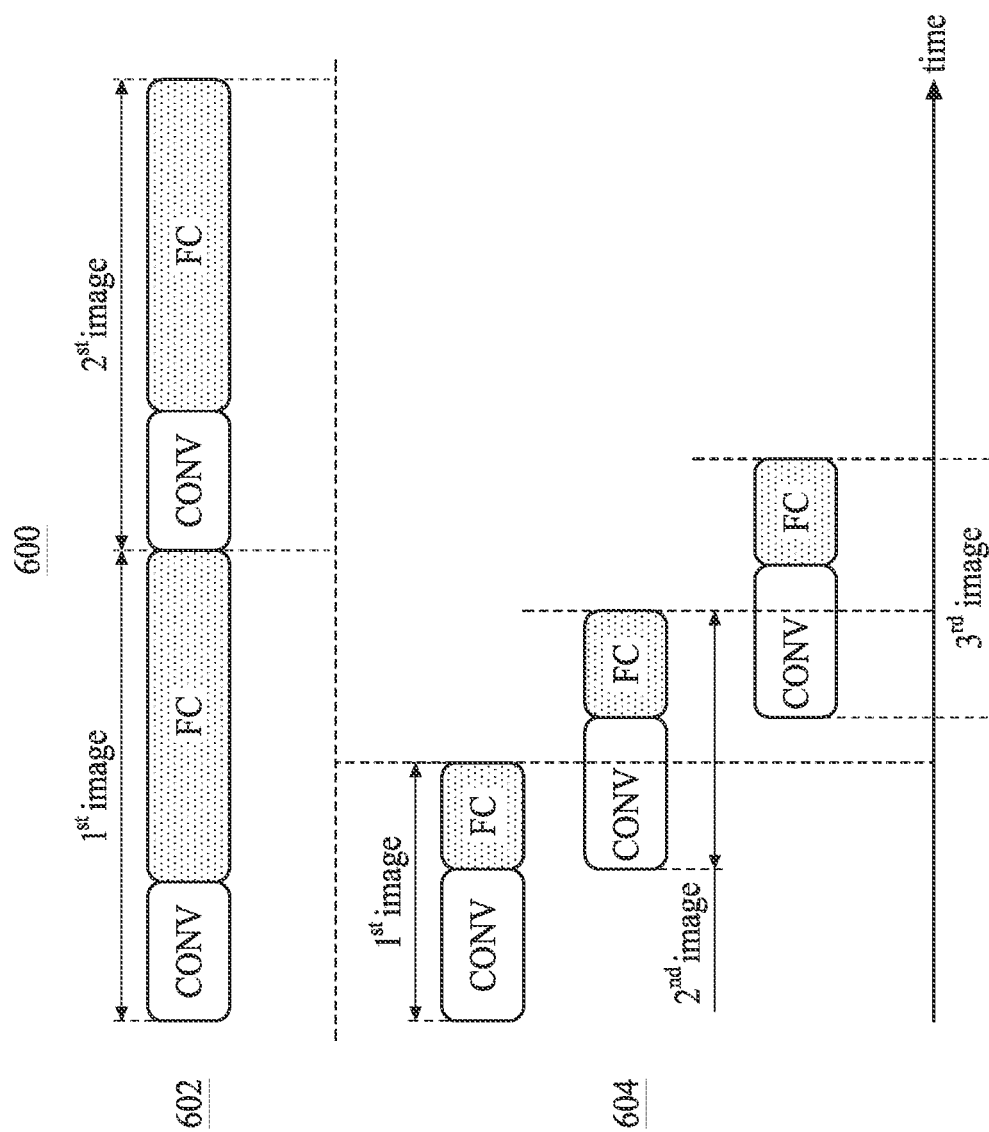
FIG. 6 illustrates an example timeline for comparing the timing of the single dataflow and a combined dataflow, in accordance with some embodiments.

FIG. 6 illustrates an example timeline 600 for comparing the timing of the single dataflow 602 and a combined dataflow (e.g., weight stationary and input stationary) 604, in accordance with some embodiments. Each of the single dataflow 602 and the combined data flow 604 show lengths of computation cycles for each layer. The cycles include the convolutional cycle (denoted as "CONV") and the fully connected cycle (denoted as "FC"). The CONV cycles are performed in the convolutional core (e.g., convolutional core 200A) and the FC cycles are performed in the fully connected core (e.g., fully connected core 200B). Although certain lengths are shown for the CONV and FC cycles, these lengths are shown as an example for illustration and embodiments are not limited thereto.

The single dataflow 602 includes convolutional and fully connected layers that are configured for one type of data flow (e.g., weight stationary dataflow). The single dataflow 602 includes a first image being analyzed, followed by a second image being analyzed. For example, the first image analysis includes a first CONV cycle and a first FC cycle, and the second image analysis include a second CONV cycle and second FC cycle. The input stationary dataflow may be computed in a fully connected layer faster than a weight stationary dataflow in the fully connected layer. Accordingly each of the FC cycles in the combined dataflow 604 may be shorter than the FC cycles in the single dataflow 602.

The combined dataflow 604 includes convolution layers that are configured for weight stationary dataflow and fully connected layers that are configured for input stationary dataflow. The combined dataflow 604 includes analyzing a first image which includes a first CONV cycle and a first FC cycle. At the end of the first CONV cycle, a second image may be provided to the convolutional layer for analysis, while the first image is analyzed in the fully connected layer. Accordingly, the CONV cycle of the second image and the FC cycle of the first image may begin simultaneously or substantially simultaneously. Similarly, when the second image is undergoing the FC cycle, the third image may be provided to the convolutional layer to start the CONV cycle. Accordingly, the FC cycle of the second image and the CONV cycle of the third image may begin simultaneously (or substantially simultaneously).

FIG. 7 illustrates an example table 700 that compares the cycles, utilization, and buffer accesses performed by the fixed dataflow accelerator (FDA) and the HDA, in accordance with some embodiments. The FDA includes PEs that are configured only for the weight stationary dataflow. The HDA includes PEs in the convolutional layers configured for the weight stationary dataflow and the PEs in the fully connected layers configured for the input stationary dataflow. The numbers in table 700 are based on a neural network that has 5 CONV layers and 3 FC layers. The FDA had 16×16 PE arrays configured for weight stationary only for both the CONV layers and the FC layers. On the other hand, the HDA had a 16×15 PE array that was configured for weight stationary for the CONV layers and a 16×1 PE array that was configured for input stationary for the FC layers.

The numbers shown in table 700 are merely examples to show the advantages of the HDA, and embodiments are not limited thereto.

In some embodiments, cycles may include clock cycles of a system clock. For the FDA, the CONV layer takes 4,884,438 clock cycles while the CONV layer for the HDA takes clock cycles which is longer by about 11%. However, the FC layer takes 10,768,640 cycles in the FDA whereas it takes 3,697,600 cycles in the HDA which is about 66% shorter. In total, the FDA layer takes 15,653,078 cycles, whereas the HDA takes 9,116,742 cycles which is a 42% faster. Accordingly, the HDA may take 42% less time than the FDA.

The reason the FC layers take so much less time may be explained by the utilization of the PE arrays of the FC layer. Utilization refers to how much of the PEs within the PE arrays are being utilized. For table 700, the utilization may equal the number of MACs divided by the product of the number of PEs and the number of cycles. For the CONV layer, the FDA has a utilization of 86%, whereas the HDA has a utilization of 83% which is slightly lower. However, for the FC layer, the utilization for the FDA is 2% whereas the utilization for the HDA is 93% which is a very large jump and very high utilization.

A number of buffer accesses between the FDA and the HDA are roughly similar. The number of buffer accesses refers to the number of times the PEs read from the input buffer and/or the weight buffer to retrieve the inputs and/or weights in performing the computations. For example, the CONV layer for the FDA took about 568 million buffer accesses, whereas the CONV layer for the HDA took about 630 million buffer accesses. The FC layer for the FDA took about 498 million buffer accesses, and the FC layer for the HDA took about 469 million buffer accesses. The total number of buffer accesses for the FDA was about 1.07 billion, and the total number of buffer accesses for the HDA was about 1.10 billion. Accordingly, the numbers of buffer accesses are similar.

Figure 8:
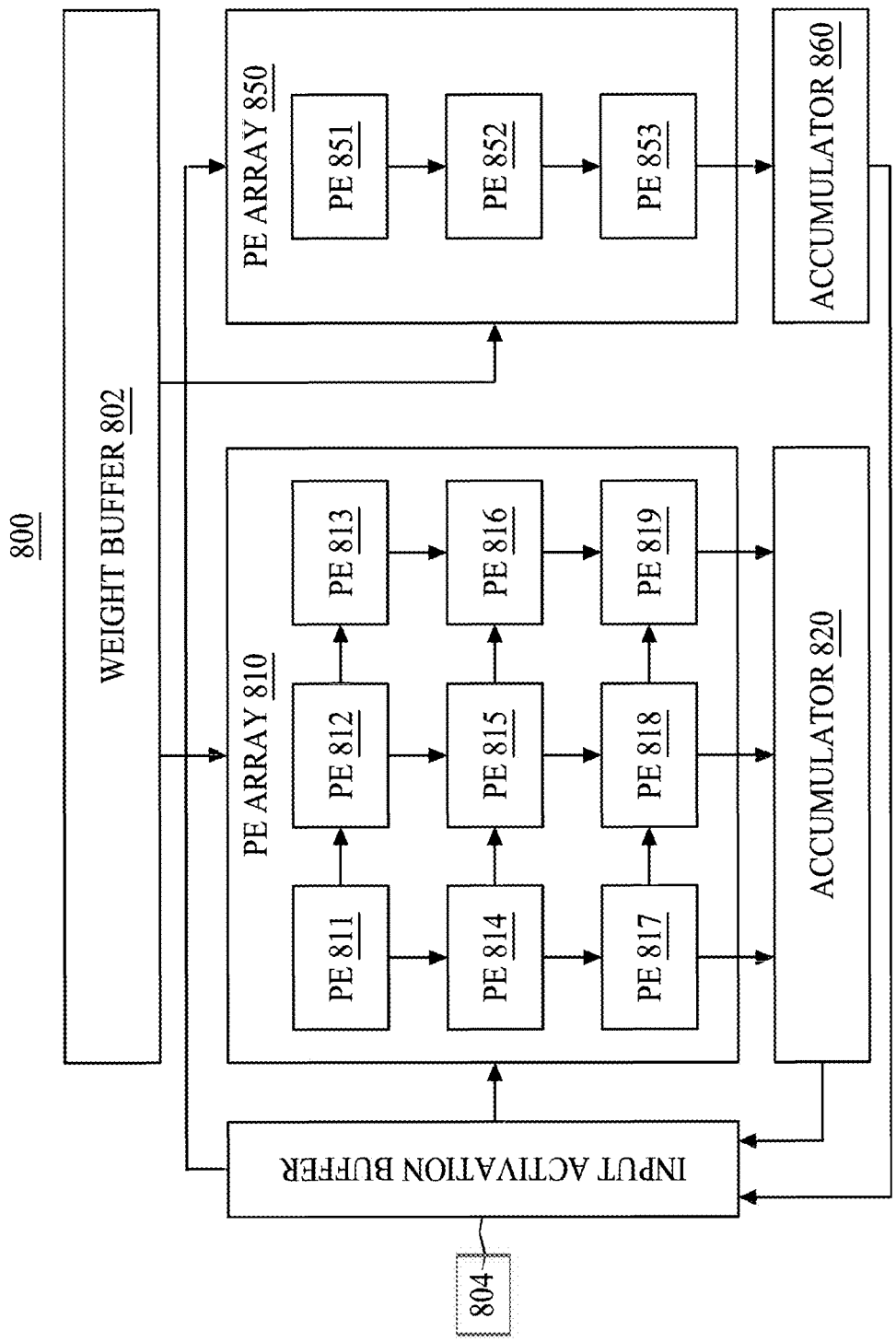
FIG. 8 illustrates an example block diagram of a pipelined core of an AI accelerator, in accordance with some embodiments.

FIG. 8 illustrates an example block diagram of a pipelined core 800 of an AI accelerator, in accordance with some embodiments. The PE array 810 is similar to the PE array 210 of FIG. 2, and the PE array 850 is similar to the PE array 250 of FIG. 2. Accordingly, similar descriptions are omitted for clarity and simplicity. The PE array 810 may be configured for a weight stationary dataflow, and the PE array 850 may be configured for an input stationary dataflow, but embodiments are not limited thereto.

The weight buffer 802 is similar to the weight buffer 202 and the weight buffer 230, except that the weight buffer 802 is only one memory. The weight buffer 802 may be a combined 2-port read (or 2-port read and 2-port write) memory that can read from and/or write to two memory locations at the same time. For example, the weight buffer 802 may include weights for the PE array 810 and the weights for the PE array 850. Accordingly, the PE array 810 can receive the weights from the weight buffer 802 for the PE array 810 while the PE array 850 is receiving the weights from the weight buffer 802 for the PE array 850 at the same time.

Furthermore, the input activation buffer 804 is similar to the input activation buffer 204 and the input activation buffer 240, except that the input activation buffer 804 is only one memory. Similar to the weight buffer, the input activation buffer 804 may be a combined 2-port read (or 2-port read and 2-port write) memory that can read from and/or write to two memory locations at the same time. Accordingly, the PE array 810 can receive the input activation states from the input activation buffer 804 for the PE array 810 while the PE array 850 is receiving the input activation states for the PE array 850 from the input activation buffer 804 at the same time. Accordingly, the pipelined core 800 may additionally reduce area.

Figure 9:
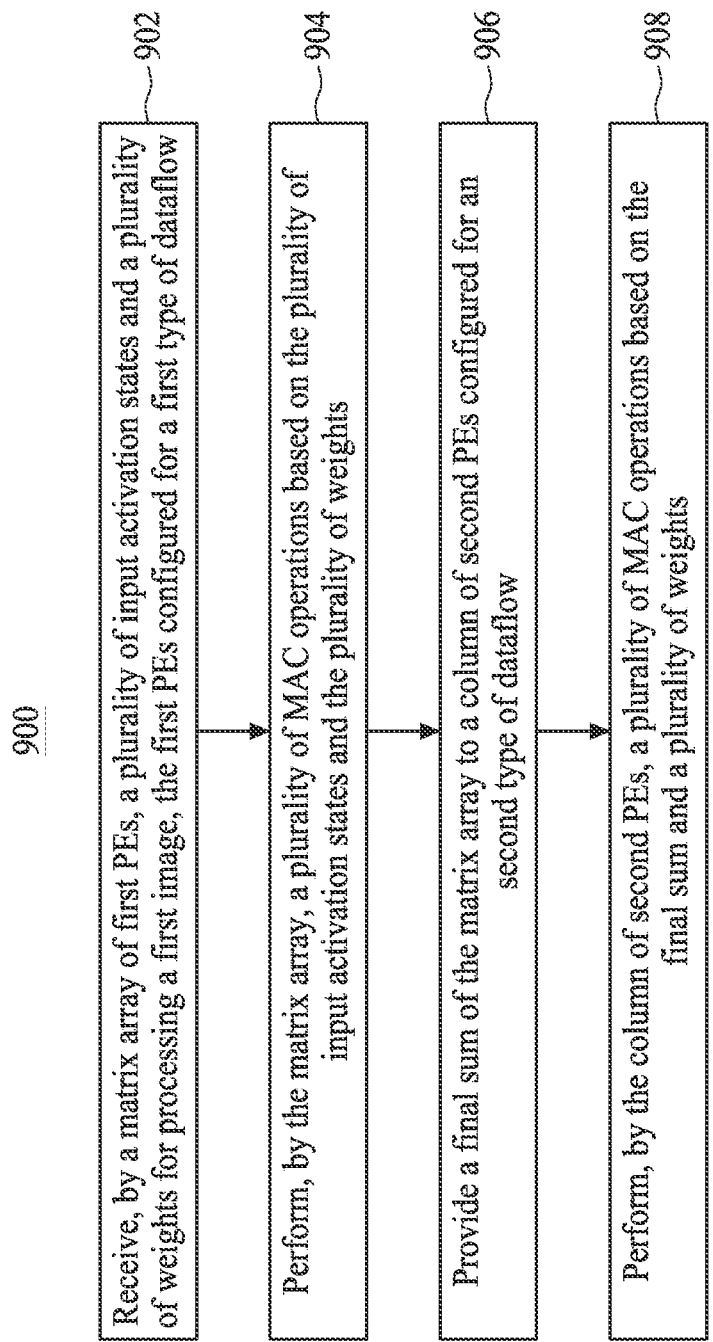
FIG. 9 illustrates a flowchart of an example method of operating a pipelined core for an AI accelerator, in accordance with some embodiments.

FIG. 9 illustrates a flowchart of an example method 900 of operating pipelined processing cores for an AI accelerator, in accordance with some embodiments. The example method 900 may be performed with the pipelined core 200. In brief overview, the method 900 starts with operation 902 of receiving, by a matrix array of first PEs (e.g., PE array 210) of a first pipelined core of the AI accelerator, a plurality of input activation states (e.g., from the input activation buffer 204) and a plurality of weights (e.g., from the weight buffer 202) for processing a first image, the first PEs (e.g., PEs 211-219) configured for a first type of dataflow (e.g., weight stationary dataflow). The method 900 continues to operation 904 of performing, by the matrix array, a plurality of MAC operations based on the plurality of input activation states and the plurality of weights. The method 900 continues to operation 906 of providing a final sum of the matrix array to a column of second PEs (e.g., PE array 250) of a second pipelined core of the AI accelerator, the column of second PEs configured for a second type of dataflow. The method 900 continues to operation 908 of performing, by the column of second PEs, a plurality of MAC operations based on the final sum and a plurality of weights (e.g., from weight buffer 230).

Regarding operation 902, the input activation states may include an image or a processed image. In some embodiments, the input activation states may include outputs of a different matrix array with which MAC operations were performed and partial sums and/or final sum were obtained. For example, the input activation states may include output activation states (or outputs) of a previous layer in the neural network.

Regarding operation 904, the MAC operations may be performed in the first PEs. For example, if the first type of dataflow is the weight stationary dataflow, the weights may be stored in the memory (e.g., weight memory and/or register) in each of the first PEs. The input activation states may be provided from the input activation buffer every cycle (e.g., broadcasted). The input activation state may be multiplied by the weight. And the partial sum from the PE of the previous row (or 0 if the PE performing the operation is at the top row) may be summed with the product of the input activation state and the weight. The sum may be a partial sum that may be stored in a partial sum memory and output for the next row or to an accumulator (e.g., accumulator 220).

Regarding operation 906, the final sum from the accumulator may be provided as an input (or input activation state) of the input activation buffer of a column of second PEs. The second PEs may be configured to perform input stationary dataflow operations.

Regarding operation 908, the MAC operations may be performed in the column of second PEs. As described above, the inputs may be stored in each of the input buffers in the second PEs. The weights may be provided by a second weight buffer. The weights and inputs may be multiplied and then summed with a partial sum from the previous row. The output may be provided to the accumulator 260. While the MAC operations are being performed in the column of second PEs, input activation states and weights of a second image may be provided to the matrix array of first PEs such that the first PEs and the second PEs are able to perform calculations for the second and first images, respectively, in a pipelined manner as discussed below.

In one aspect of the present disclosure, a pipelined processing core of an AI accelerator is disclosed. The pipelined processing core includes a first processing core configured to have a first type of dataflow and a second processing core configured to have a second type of dataflow. The first processing core includes a matrix array of PEs arranged in columns and rows, each of the PEs configured to perform a MAC operation based on an input and a weight. The second processing core is configured to receive an output from the first processing core. The second processing core includes a column of PEs configured to perform MAC operations.

In another aspect of the present disclosure, a method of operating a pipelined processing core for an AI accelerator is disclosed. The method includes receiving, by a matrix array of first PEs of a first pipelined core of the AI accelerator, a plurality of input activation states and a plurality of weights for processing a first image, the first PEs configured for a first type of dataflow, performing, by the matrix array, a plurality of MAC operations based on the plurality of input activation states and the plurality of weights, providing a final sum of the matrix array to a column of second PEs of a second pipelined core of the AI accelerator, the column of second PEs configured for a second type of dataflow, and performing, by the column of second PEs, a plurality of MAC operations based on the final sum and a plurality of weights.

In yet another aspect of the present disclosure, a pipelined processing core of an AI accelerator is disclosed. The pipelined processing core includes a first processing core configured to have a first type of dataflow and a second processing core configured to have a second type of dataflow. The first processing core includes a first weight buffer configured to provide a plurality of weights, a second input activation buffer configured to provide a plurality of input activation states, a matrix array of PEs arranged in columns and rows, each of the PEs configured to perform a MAC operation based on an input activation state from the first input activation buffer and a weight from the first weight buffer, wherein the matrix array is configured to output a plurality of partial sums, and an accumulator configured to receive the partial sums from the matrix array and calculate a final sum. The second processing core includes a second input activation buffer configured to receive and store the final sum, a second weight buffer configured to store a plurality of weights, and a column of PEs configured to perform MAC operations based on a weight from the second weight buffer and the final sum.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A pipelined processing core of an artificial intelligence (AI) accelerator, the pipelined processing core comprising:
   a first processing core configured to have a weight stationary dataflow, wherein the first processing core includes:
      a matrix array of processing elements (PEs) arranged in columns and rows, each of the PEs configured to perform a multiplication and accumulation (MAC) operation based on an input and a weight;
   a second processing core configured to have an input stationary dataflow, the second processing core configured to receive an output from the first processing core, wherein the second processing core includes:
      a column of PEs configured to perform MAC operations.

2. The pipelined processing core of claim 1, wherein the first processing core is located in a convolutional layer of a neural network.

3. The pipelined processing core of claim 1, wherein the second processing core is located in a fully connected layer of a neural network.

4. The pipelined processing core of claim 1, wherein the first processing core further includes:
   a weight buffer configured to store weights and output the weights to the matrix array of PEs; and
   an input activation buffer configured to store input activation states and output the input activation states to the matrix array of PEs.

5. The pipelined processing core of claim 4, wherein the second processing core further includes:
   a weight buffer configured to store weights and output the weights to the column of PEs; and
   an input activation buffer configured to store input activation states and output the input activation states to the column of PEs.

6. The pipelined processing core of claim 5, wherein the first processing core further includes an accumulator configured to receive partial sums output from the matrix array and accumulate the partial sums, wherein the accumulator is configured to provide an accumulated output to the input activation buffer of the first processing core and the input activation buffer of the second processing core.

7. The pipelined processing core of claim 5, wherein the second processing core further includes an accumulator configured to receive partial sums output from the column and accumulate the partial sums, wherein the accumulator is configured to provide an accumulated output to the input activation buffer of the second processing core.

8. The pipelined processing core of claim 5, further comprising a combined weight buffer that includes the weight buffer of the first processing core and the weight buffer of the second processing core, wherein the combined weight buffer includes a 2-port read and write memory.

9. The pipelined processing core of claim 5, further comprising a combined input activation buffer that includes the input activation buffer of the first processing core and the input activation buffer of the second processing core, wherein the combined input activation buffer includes a 2-port read and write memory.

10. A method of operating pipelined processing cores for an artificial intelligence (AI) accelerator, comprising:
    receiving, by a matrix array of first processing elements (PEs) of a first pipelined core of the AI accelerator, a plurality of input activation states and a plurality of weights for processing a first image, the first PEs configured for a weight stationary dataflow;
    performing, by the matrix array, a plurality of multiply and accumulate (MAC) operations based on the plurality of input activation states and the plurality of weights;
    providing a final sum of the matrix array to a column of second PEs of a second processing core of the AI accelerator, the column of second PEs configured for an input stationary dataflow; and
    performing, by the column of second PEs, a plurality of MAC operations based on the final sum and a plurality of weights.

11. The method of claim 10, further comprising:
    during the performing of the plurality of MAC operations by the column of PEs, receiving, by the matrix array, a second image; and
    performing, by the matrix array, a plurality of MAC operations based on the second image and a plurality of weights.

12. The method of claim 10, wherein the matrix array of first PEs is included in a convolutional layer of a neural network, and the column of second PEs is included in a fully connected layer of the neural network.

13. The method of claim 10, further comprising:
    accumulating a plurality of partial sums output from the matrix array of first PEs;
    based on the accumulated plurality of partial sums, providing the final sum to an input activation buffer; and
    providing the final sum to the column of second PEs.

14. The method of claim 10, further comprising:
    storing, in a plurality of memories in the first PEs, a plurality of weights; and
    storing, in a plurality of memories in the second PEs, a plurality of input activation states.

15. A pipelined processing core of an artificial intelligence (AI) accelerator, the pipelined processing core comprising:
    a first processing core configured to have a weight stationary dataflow, wherein the first processing core includes:
       a first weight buffer configured to provide a plurality of weights;
       a first input activation buffer configured to provide a plurality of input activation states;
       a matrix array of processing elements (PEs) arranged in columns and rows, each of the PEs configured to perform a multiplication and accumulation (MAC) operation based on an input activation state from the first input activation buffer and a weight from the first weight buffer, wherein the matrix array is configured to output a plurality of partial sums;
       an accumulator configured to receive the partial sums from the matrix array and calculate a final sum;
    a second processing core configured to have an input stationary dataflow, the second processing core configured to receive an output from the first processing core, wherein the second processing core includes:
       a second input activation buffer configured to receive and store the final sum;
       a second weight buffer configured to store a plurality of weights;
       a column of PEs configured to perform MAC operations based on a weight from the second weight buffer and the final sum.

16. The pipelined processing core of claim 15, wherein the first processing core is located in a convolutional layer of a neural network.

17. The pipelined processing core of claim 15, wherein the second processing core is located in a fully connected layer of a neural network.

\* \* \* \* \*